D. COLLINS.
Manufacturing Picks.
139,455. Patented June 3, 1873.
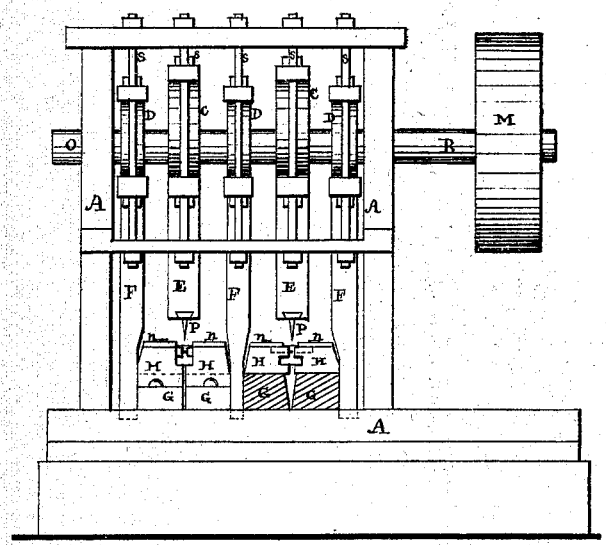
Fig.1.
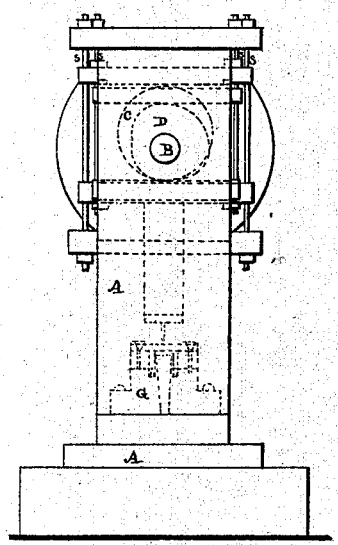
Fig.2.
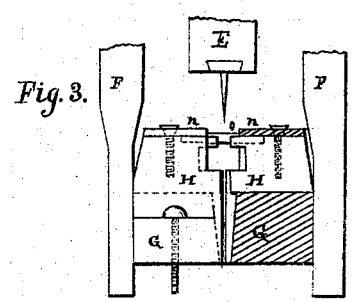
Fig.3.
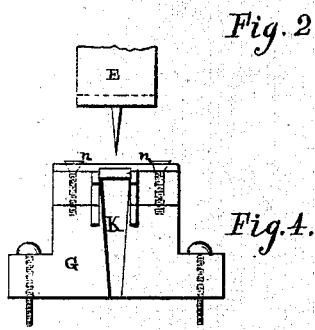
Fig.4.
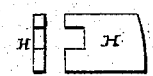
Fig.8.
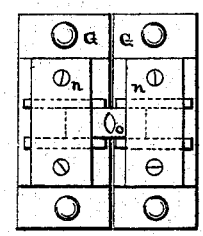
Fig.7.
Fig.5.
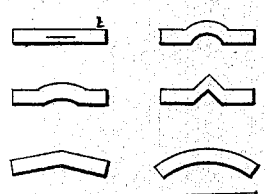
Fig.6.
Witnesses
Thomas F. Murray,
Wm S. Henson.
Inventor.
Daniel Collins

UNITED STATES PATENT OFFICE.

DANIEL COLLINS, OF NEWARK, NEW JERSEY.

IMPROVEMENT IN MANUFACTURING PICKS.

Specification forming part of Letters Patent No. 139,455, dated June 3, 1873; application filed February 14, 1873.

*To all whom it may concern:*

Be it known that I, DANIEL COLLINS, of Newark, in the county of Essex and State of New Jersey, have invented certain Improvements in Manufacturing Socket-Eye Picks.

My invention has for its object to produce socket-eyes for picks and tools of a similar nature; and consists in the combination of the reciprocating pieces sliding in recesses, the blocks, stripper-plate and wedge-shape frames, as hereinafter fully described; and I do hereby declare that the following is a full, clear, and exact description thereof, which will enable others skilled in the art to which it appertains to make and use the same, reference being had to the accompanying drawing, with letters of reference marked thereon forming a part of this specification, in which—

Figure 1 is a front elevation of a machine containing my improvements. Fig. 2 is an end elevation of the same, showing the eccentrics and cams in dotted lines. Fig. 3 is a front view of a pair of the stationary blocks containing the moveable holding-pieces, holding a prepared piece of iron ready for the piercing-tool, together with the vertical crutch-frames with their inclined faces for operating the holding-pieces, (one of the blocks being shown in section;) also the piercing-tool in position above the prepared piece of iron. Fig. 4 is an end view of the same, showing one of the prepared pieces in position ready for the piercing-tool. Fig. 5 is a plan of a pair of blocks with the sliding-holders, the stripper and cap-plates to keep them in their places. Fig. 6 represents a variety of forms or shapes, into any one of which, or modification thereof, the plane-pieces may be bent preparatory to the white-heat operation of the piercing-tool and stationary blocks. Fig. 7 is one of the holding-pieces shown in two views. Fig. 8 is a stripper-plate of iron, with an aperture in the center to enable the piercing-tool to be withdrawn from the new-formed eye without lifting the eye too much.

A is the frame of the machine. B is a shaft upon which are keyed the two eccentrics C C, and the three cams D D D. E E are two crutch-frames upon the eccentrics C C, and each having firmly attached at their lower ends a piercing-tool, P P. F F F are three other crutch-frames upon the three cams D D D, the lower ends of which operate like wedges in driving the holding-pieces H H, which slide in recesses in the iron blocks G G, (see one pair of blocks in section in Fig. 1 and Fig. 3,) and held down by plates *n n* screwed firmly on the top of the blocks G. The blocks G are firmly fastened to the bed of the frame A, and the said blocks are so shaped on their near sides to each other as to give the proper shape to the hot metal forced out by the piercing-tool P. (See Fig. 4, where one block is removed in order to show the other on the face not otherwise visible.) All the crutch-frames slide up and down on the slide-rods *s s s*, &c., when the shaft B is driven by suitable gearing at *m m*, which I have not shown, but will readily be understood.

The mode of operation is as follows: A number of wrought-iron bars, about one and one-fourth inches square, are cut into suitable lengths, from six inches to fifteen inches, according to the judgment of the operator; these are heated to a red heat, and, either by a drop-press or other means suitably arranged, bends them one at a time into some one of the shapes shown at Fig. 6, and cuts an indentation, shown at *t*, Fig. 6, about one and a half inch long, and about half-inch deep in the convex face of each in the center thereof. These pieces are put into a furnace and heated to a white heat, and then taken one at a time and inserted between one of the pairs of blocks, (see Figs. 3 and 4,) so that, by the operation of the machine the wedge-form of the crutch-pieces operating upon the holding-pieces H H, the prepared piece is firmly held by the holders, while, by the continued operation of the machine, one of the piercing-tools P P, entering the indentation previously made, is forcibly driven through the prepared form, forcing a portion of the iron in the direction of the piercing-tool and squeezing it forcibly against the hollow cavity in the blocks G, shown at *k*, Fig. 4, giving the socket-shape desired to the eye of the pick-blank. As the piercing-tool is withdrawn by the continued operation of the machine, it lifts the new-formed socket-piece from the tapering cavities *k k*, and the piece coming in contact with the stripper-plate *o*, Fig. 8, holds it from rising higher, and the piercing-tool is withdrawn, and the operator immediately removes the socket-eyed pick-blank, and goes through the same operation with other pieces in succession.

It is not absolutely necessary to have two piercing-tools, as shown; but I prefer two, as it enables one of them to be cooling while the other is in use.

I make no claim to the use of a sharp piercing-tool, as that has been done before, in combination with a blunt piercing-tool in manufacturing adze-eye picks. Neither do I claim a socket-eye to picks, as such socket-eyes with more or less socket, according to the judgment or fancy of the makers, are very old, having been made by hand for picks, mattocks, and adzes.

Having thus fully described my invention, what I claim, and desire to secure by Letters Patent, is—

1. The combination of the reciprocating pieces H, sliding in the recesses formed in the blocks G, sliding wedge-shaped frames F, stripper-plate o, and piercing-tool P, all constructed and arranged for operation substantially as and for the purpose specified.

DANIEL COLLINS.

Witnesses:

THOMAS F. MURRAY,
WM. S. HENSON.